3,505,419
ALKALI METAL HYDROXIDE-ACETYLENE REACTION PRODUCTS
Robert J. Tedeschi, Whitehouse Station, and George L. Moore, South Plainfield, N.J., assignors to Air Reduction Company Incorporated, New York, N.Y., a corporation of New York
No Drawing. Filed Dec. 19, 1967, Ser. No. 691,723
Int. Cl. C07c *11/22;* C07f *1/00*
U.S. Cl. 260—665                                           1 Claim

ABSTRACT OF THE DISCLOSURE

Complexes of alkali metal hydroxides and acetylene useful as catalysts for the ethynylation reactions are prepared by reacting alkali metal hydroxides with liquefied acetylene.

---

This invention relates to derivatives of acetylene and is more particularly concerned with the preparation of a complex of acetylene and an alkali metal hydroxide.

Complexes of acetylene with certain compounds have previously been reported. For example, a complex of acetylene and ammonia is described by Tedeschi and his co-workers in J. Org. Chem., 28, 1740 (1963) and J. Org. Chem., 30, 3045 (1965), the latter publication also referring to complexes of acetylene and certain alkali metal hydroxides.

It is an object of this invention to provide a novel process for preparing an acetylene-alkali metal hydroxide complex.

In accordance with the invention it has been discovered that when acetylene in liquefied form is reacted with an alkali metal hydroxide in substantially anhydrous form there is formed an acetylene-alkali metal hydroxide complex or adduct which contains one molecule of the alkali metal per molecule of acetylene with an apparent formula of $MOH \cdot CH \equiv CH$, wherein M is an alkali metal. This compound is useful as a catalyst for ethynylation reactions, e.g. the formation of vinyl ethers, acetylenic alcohols, and the like.

In forming the complex of this invention, the reaction between the liquefied acetylene and the alkali metal hydroxide is advantageously carried out at a temperature of $-30$ to $50°$ C., preferably 10 to $35°$ C. The acetylene can be used in previously liquefied form, or gaseous acetylene can be liquefied in the reaction vessel itself by introducing the gaseous acetylene under pressure into the vessel at a low temperature so that the acetylene is cooled below its critical temperature.

The liquid acetylene used in accordance with this invention can be readily prepared by introducing compressed gaseous acetylene into a cooled vessel from a gas cylinder or other source. Ordinary cylinders of acetylene are at a pressure of about 250 p.s.i.g. when full. The acetylene can be used directly from the cylinder but preferably the pressure of the acetylene is increased to about 400 p.s.i.g. before the liquefaction step by introducing the acetylene into a pressure vessel or accumulator and pumping mineral oil into the bottom of the vessel until the desired acetylene pressure is obtained. As previously mentioned, the liquefaction of the acetylene is most readily effected in the autoclave or other vessel in which the reaction of the invention is to be carried out. Thus, the compressed gaseous acetylene is introduced into the reaction vessel which is suitably cooled to a sufficiently low temperature to cause liquefaction of the acetylene. By using vapor pressure-temperature and density-temperature data such as found in V. J. Clancey, "Liquid and Solid Acetylene: A Review of Published Information" (England); Explosives Research and Development Establishment Survey 1/5/61, 1952, and in S. A. Miller, "Acetylene," Academic Press, pp. 506–516 (1965), the temperature needed for liquefaction of acetylene at a given acetylene pressure can be readily ascertained. In general, with an acetylene pressure of about 400 p.s.i.g., a temperature of $-10$ to $-30°$ C. is sufficient to allow rapid liquefaction of the acetylene. Cooling of the reaction vessel, which is, of course, supplied with appropriate cooling coils or a cooling jacket, is readily achieved by means of any suitable cooling medium, and a particularly effective cooling medium is methanol which has been cooled by circulation through coils immersed in secondary butanol, or a mixture of ethylene glycol and methanol, containing pieces of solid carbon dioxide (Dry Ice). Heating of the reaction vessel is easily effected by circulating the methanol through a body of warm water.

In a preferred procedure, the alkali metal is first introduced into the reaction vessel, which is, of course, a pressure vessel, such as an autoclave adapted to withstand the pressures encountered. The autoclave is then sealed except for valved feed and exit lines. The liquefied acetylene is then added, most suitably, as mentioned, by directly liquefying it in the vessel which has been cooled to the appropriate temperature for liquefaction of the acetylene at the pressure under which the acetylene is introduced. Exit and feed valves are finally closed and the temperature raised to the desired reaction temperature. The time of reaction will vary, but ordinarily it will be complete within 2 to 4 hours. However, the above-mentioned reaction time is not limitative of the invention, and shorter or longer times may be employed as required.

The acetylene is used in at least equimolar quantities with respect to the alkali metal hydroxide, with an excess of acetylene preferred, and the molar ratio between the acetylene and alkali metal hydroxide being most advantageously at least about 2:1, preferably at least about 3:1. Higher ratios can be used but generally there is no advantage in a ratio above 12:1.

The reaction zone is freed from air and dried before the reactants are introduced. This is suitably effected by sweeping the reaction zone with a dry inert gas, such as dry nitrogen. After the reaction is completed, excess acetylene is vented and the complex which has been formed is then removed.

As mentioned, the reaction is suitably carried out in any reaction vessel adapted to be operated under gauge pressure, such as an autoclave suitably jacketed for temperature control and provided with an agitator, and the components of the reaction mixture are introduced by the use of conventional supply means, such as cylinders or tanks. The amounts charged to the autoclave are advantageously determined by the use of conventional gauging or measuring devices.

The invention will now be further illustrated by reference to the following specific examples, but it will be understood that the invention is not limited to this illustrative embodiment.

EXAMPLE 1

The apparatus employed was a 125 ml. stainless steel high-pressure autoclave, which was equipped with an inner coil and jacket for heating and cooling, and a suitable stirrer. The autoclave was dried by warming to about $50°$ C. and sweeping with $N_2$ prior to adding the alkali metal hydroxide which, in this case, was potassium hydroxide. Finely-divided anhydrous powder (96% potassium hydroxide, 0.30 mole, 100% basis) was quickly introduced into the dry autoclave under a moderate current of dry nitrogen gas and the autoclave was then quickly sealed. Efficient cooling was effected by the use of a 2–3 gallon reservoir of ethylene glycol-methanol (1:1) in which a copper cooling coil was immersed. Copper lines from the coil exposed to the atmosphere and leading to the autoclave were insulated. The methanol cooling liquid in the system was circulated by means of a pump. By continual introduction of small pieces of solid carbon dioxide into the reservoir a temperature of −40 to −60° C. was readily reached.

After cooling the autoclave to about −40° C. the acetylene was condensed in the autoclave (44 cc. of liquid, 0.90 mole).

A moderate exothermic effect was observed on liquefaction which is readily controlled by the circulating heat exchange fluid. After all the acetylene had been liquefied into the reactor, the autoclave stirrer was turned on and the reaction temperature cautiously raised to about 20° C. No pronounced or significant exothermic effect was observed on raising the temperature. The reaction temperature was then gradually increased and maintained in the range of 24–30° C., and in this range the pressure varied from 620–730 p.s.i.g. The resulting reaction mixture of liquid acetylene and potassium hydroxide was stired for a total of two hours maintaining the temperature, preferbly close to 25° C.

The autoclave stirrer was turned off. The autoclave vent line connecting to the vent stack draft was disconnected, and the autoclave was cooled to about 20° C. The autoclave vent valve was then very carefully and slowly opened to avoid sudden pressure surge and the gas slowly vented through the meter at a rate of approximately 1 liter per minute. The total observed volume of gas vented through the meter was 19.94 liters.

The autoclave was not opened and the product potassium hydroxide-acetylene adduct or complex was slurried by adding 60 cc. of isopropyl ether. The slurry was saturated with acetylene at 120 p.s.i.g. and 20° C., then the slurry was removed after bleeding of the excess acetylene. The slurry was filtered and the solid product dried with suction under an acetylene atmosphere. The product recovered represented a 64% conversion based on the alkali metal hydroxide and was in the form of a granular solid of whitish color. Analytical data and calculations showed an equimolar KOH-acetylene complex, viz $$KOH \cdot CH \equiv CH$$

EXAMPLE 2

The procedure of Example 1 was repeated except that 20 cc. of liquid ammonia was added to the autoclave with 0.14 mole of potassium hydroxide and 0.60 mole of aceylene, and reaction was carried out for 1 hour. A product identical with that obtained in Example 1 was recovered in an amount representing a 44% conversion.

EXAMPLE 3

The procedure of Example 1 was again repeated except that 0.30 mole of anhydrous powdered sodium hydroxide was substituted for the potassium hydroxide used in Example 1. Using 0.90 mole of acetylene, as in Example 1, the reaction temperature was in the range of 21–24° C. and the pressure was 600–665 p.s.i.g. After a reaction period of 2 hours, a sodium hydroxide-acetylene complex was recovered in an amount representing a conversion of 59%. The complex was in the form of a granular solid and was of light tan color and, like the potassium hydroxide-acetylene complex, was a equimolecular complex, viz $NaOH \cdot CH \equiv CH$.

EXAMPLE 4

Again using the procedure described in Example 1, a lithium hydroxide-acetylene complex was formed by reacting 0.30 mole of lithium hydroxide and 0.90 mole of acetylene at 22–8° C. and 610–690 p.s.i.g. for 3 hours. The product, representing a 70% conversion, was in the form of a fine powder and was of a white color. It was found to be an equimolecular complex, viz $$LiOH \cdot CH \equiv CH$$

It will be understood that various changes and modifications can be made without departing from the invention as above described, and without departing from the invention as defined in the appended claim. It is intended, therefore, that all matter contained in the foregoing description shall be interpreted as illustrated only and not as limitative of the invention.

We claim:
1. A process of producing a 1:1 complex of acetylene and alkali metal hydroxide which comprises reacting the alkali metal hydroxide in anhydrous form and in the absence of solvents with liquefied acetylene.

References Cited

UNITED STATES PATENTS 2,965,684   12/1960   Fruhwirth et al. _____ 260—665

OTHER REFERENCES

Tedeschi: J. Org. Chem., 30 (1965), pp. 3045–9.

TOBIAS E. LEVOW, Primary Examiner

A. P. DEMERS, Assistant Examiner

UNITED STATES PATENT OFFICE
CERTIFICATE OF CORRECTION

Patent No. 3,505,419              Dated April 7, 1970

Inventor(s) Robert J. Tedeschi and George L. Moore

It is certified that error appears in the above-identified patent and that said Letters Patent are hereby corrected as shown below:

Col. 3, line 21, "stired" should read -- stirred --;
       line 27, after "avoid" and before "sudden"
                insert -- a --.

Col. 4, line 22, "22-8°C." should read -- 22-28°C. --;
       line 33, the word "illustrated" should read
                -- illustrative --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents